(No Model.)

L. OTT.
GAS COCK.

No. 441,190.

Patented Nov. 25, 1890.

Witnesses
E. D. Smith
Alex. F. Stewart

Inventor
Louis Ott
By his Attorneys
Church & Church

THE NORRIS PETERS CO., PHOTO-LITHO., WASHINGTON, D. C.

UNITED STATES PATENT OFFICE.

LOUIS OTT, OF HARRISBURG, PENNSYLVANIA.

GAS-COCK.

SPECIFICATION forming part of Letters Patent No. 441,190, dated November 25, 1890.

Application filed June 17, 1890. Serial No. 355,811. (No model.)

*To all whom it may concern:*

Be it known that I, LOUIS OTT, of Harrisburg, in the county of Dauphin and State of Pennsylvania, have invented certain new and useful Improvements in Gas-Cocks; and I do hereby declare the following to be a full, clear, and exact description of the same, reference being had to the accompanying drawings, forming a part of this specification, and to the letters of reference marked thereon.

This invention relates to improvements in gas-cocks such as are used at the base of domestic lighting and other burners, and has for its object to provide a simple and efficient cock which will automatically lock when in closed position or turned off, thereby preventing any danger of the gas being accidentally turned on when not lighted.

The invention consists in certain novel details of construction and combinations and arrangements of parts, to be hereinafter described, and pointed out particularly in the claims at the end of this specification.

Figure 1:
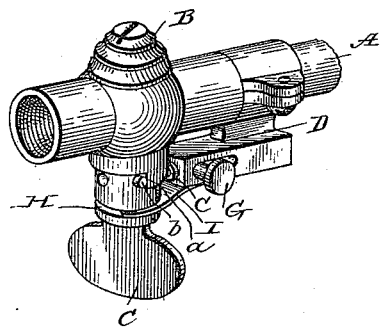
Figure 2:
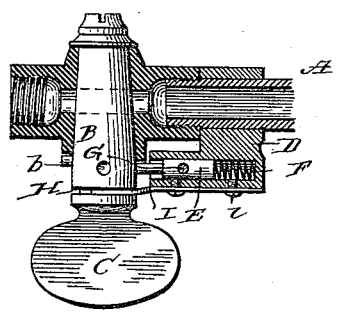
Figure 3:
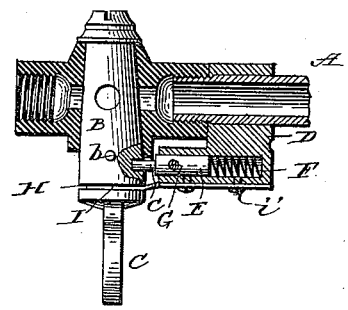
Figure 4:
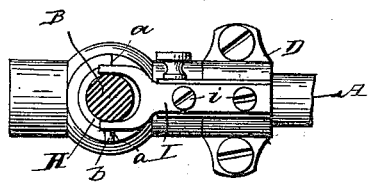

In the accompanying drawings, Figure 1 is a perspective view of a cock constructed in accordance with my invention. Fig. 2 is a central vertical section of the same with the cock turned on. Fig. 3 is a similar view with the cock turned off. Fig. 4 is a bottom plan with the stem of the cock broken away to show the spring.

Like letters of reference indicate the same parts in all the figures.

In the preferred form of the device shown in the drawings the ordinary gas-cock may be employed without change, save that two small notches or apertures are formed in opposite sides for the engagement of the locking bolt or latch.

A indicates the service or distribution pipe through which gas is supplied to the burner, and having at any suitable point in its length the T-fitting constituting the valve-chamber in which the cock B works. The bottom of the fitting may be provided with the usual shoulders $a$, against which the pin $b$ on the cock abuts when the latter is turned off, and on the lower end of the cock is the handle or thumb-piece C.

In rear of the fitting is a bracket or casing D, supported on the fitting or pipe in any desired manner, but preferably formed integral with a divided collar D', which surrounds the pipe and is clamped thereto by screws, enabling the bracket to be easily and quickly applied to any ordinary fixture after the same is in place. This bracket D is hollow, or has a recess or seat therein in which slides the locking bolt or latch E, adapted to be pressed forward with its small forward end in position to engage either of the recesses in the cock by means of a small spiral spring F, located within the recess in rear of the latch. A knob or handle G, screw-threaded into the bolt or latch, projects through a slot in the side of the bracket and serves as a convenient means for retracting the bolt as well as to prevent the escape of the same from its seat. The notches in the cock are properly positioned for the engagement of the latch only when the cock is turned off in one direction or the other, and the latch enters the same far enough to hold the cock absolutely against movement in either direction until withdrawn by means of the knob at the side, as will be readily understood.

In the preferred construction the fitting is notched at the point where the latch passes through the same, and would therefore hold the cock against rotation even though the split sleeve should become loose. As a further precaution against accident of this kind, and also to hold the cock tightly to its seat, even should the top screw and washer become loose or be removed, the stem of the cock is provided with an annular groove or recess H, in which fits the forked end of a spring I, secured rigidly on the lower face of the bracket, preferably by means of screws $i$ $i$. This spring is under constant but slight tension upward, and thereby holds the cock firmly to its seat, insuring a regular wear and preventing the accidental escape of gas or the turning of the cock when the bolt is in engagement.

In use it is only necessary for the person wishing to light the gas to press back the latch and turn the cock, and when he turns the cock to cut off the gas the latch at once engages and prevents the same being turned on again without a special movement or effort on the part of the person and the operation of a member entirely distinct from the thumb-piece or cock itself.

While I have described the device as removable and adapted for application to any ordinary fitting, it is obvious that when the fittings, &c., are especially intended for use in connection with this invention the bracket may be cast integral with the fitting and other minor changes in details of construction made, all of which are clearly within the range of ordinary mechanical skill, without departing from the spirit of my invention. For instance, the spring I may be displaced by a metal strip having little or no resiliency and serving to hold the cock in its place without danger of its slipping out.

Having thus described my invention, what I claim as new is—

1. The combination, with the gas-cock and the removable bracket having the seat therein and means, substantially as described, for clamping the bracket in position on the pipe, of the latch sliding in the seat and engaging the cock and the knob or handle for controlling the latch, substantially as described.

2. In a device such as described, the combination, with the fitting, the cock having the notches in the side thereof, and the removable bracket clamped on the pipe and having the seat and slot therein, of the spring-pressed sliding latch fitting in said seat and adapted to enter the notches in the cock and the knob or handle passing through the slot and connected to the latch, substantially as described.

3. In a device such as described, the combination, with the fitting and the cock having the annular recess, of the bracket clamped on the pipe and having the spring-pressed latch engaging the cock and the bifurcated spring fitting in said annular recess for holding the cock to its seat, substantially as described.

LOUIS OTT.

Witnesses:
FREDERICK M. OTT,
M. W. JACOBS.